United States Patent

[11] 3,615,716

| [72] | Inventor | James F. Poulos |
| | | Golden, Colo. |
| [21] | Appl. No. | 889,251 |
| [22] | Filed | Dec. 30, 1969 |
| [45] | Patented | Oct. 26, 1971 |
| [73] | Assignee | Harry R. Combs |
| | | Denver, Colo. |
| | | a part interest |

[54] APPARATUS FOR PACKAGING EGGS
10 Claims, 5 Drawing Figs.

| [52] | U.S. Cl. | 99/177 |
| [51] | Int. Cl. | A23b 5/00 |
| [50] | Field of Search | 99/177, 171 CP |

[56] References Cited
UNITED STATES PATENTS

| 2,525,096 | 10/1950 | Damuth | 99/177 X |
| 2,858,224 | 10/1958 | Darrah | 99/177 X |
| 3,144,152 | 8/1964 | Kopp | 99/171 CP |
| 3,290,156 | 12/1966 | Ihrig | 99/177 X |
| 3,385,712 | 5/1968 | Dodge et al. | 99/177 X |
| 41,053 | 1/1864 | Blinval | 99/177 |
| 154,553 | 9/1874 | Kuh | 99/177 X |
| 821,579 | 5/1906 | Austen | 99/171 CP |
| 1,015,708 | 1/1912 | Pichon | 99/177 X |

OTHER REFERENCES

Schaible and Card, " How to Produce Frozen Eggs That the Housewife Can Use," Food Industries, May 1943, pps. 67, 68.

*Primary Examiner*—Tim R. Miles
*Attorney*—McGrew and Edwards

ABSTRACT: A method of packaging eggs including shelling the eggs and loading the shelled eggs in their natural state into a packaging apparatus has been disclosed. The packaging apparatus includes a container structure divided by restriction means into a plurality of interconnecting egg-receiving compartments. Several embodiments of the packaging apparatus are disclosed, and the restriction means operates to restrict the tendency of shelled eggs from flowing from one compartment to another so as to prevent the eggs from mixing during transport and to permit the extraction of one or more eggs at a time from the container structure. Closure means are also disclosed for tightly closing the container structure.

PATENTED OCT 26 1971 3,615,716

INVENTOR
JAMES F. POULOS
BY
ATTORNEYS

APPARATUS FOR PACKAGING EGGS

The present invention relates to egg-packaging and more particularly to novel apparatus for packaging eggs.

Heretofore, whole eggs in their shells have generally been packaged in crates between cardboard dividers for shipment to points of ultimate distribution, such as food stores. The cardboard dividers were provided to separate each egg from the others, thereby to hopefully prevent breakage of the fragile egg shells. Once at the ultimate point of distribution, the eggs were then taken from the crates and packaged in cardboard cartons of six or 12 eggs each and sold therein to consumers. A major disadvantage with such egg packaging and handling is that even with the precautions taken, a significant portion of the eggs are lost due to egg shell breakage during the shipment of the eggs, the handling of the eggs at the ultimate distribution points, or in transport of the eggs by the consumers from the food stores to their homes. Another disadvantage inherent with prior art forms of egg packaging is that since the eggs are packed in their shells, the egg distributors and consumers cannot positively inspect the white and yolk portions of the eggs to determine their freshness and wholesomeness.

It is further an object of the present invention to provide novel egg-packaging apparatus in which shelled eggs may be packed in their natural state for shipment, storage, and ultimate sale to consumers.

It is further an object of the present invention to provide novel egg-packaging apparatus in which shelled eggs may be packed in their natural state for shipment, storage, and ultimate sale to consumers.

It is additionally an object of the present invention to provide novel egg-packaging apparatus as set forth which is characterized by having interconnecting compartments, each compartment being for one egg yolk with its associated egg white, and from which individual shelled eggs may be selectively extracted.

It is another object of the present invention to provide novel egg-packaging apparatus as set forth which is characterized by being disposable, easy and inexpensive to manufacture, attractive to the consumer eye, and transparent so as to permit the ready inspection of the condition of the egg yolks and whites.

It is yet another object of the present invention to provide novel egg-packaging apparatus which is characterized by being suitable for packaging egg whites, egg yolks, or egg yolks associated with their egg white in any suitable quantity in compact, easily handled containers, the containers being substantially more compact than prior art containers since they only need to accommodate the interior portions of the eggs instead of the whole egg shells.

It is also an object of the present invention to provide novel egg-packaging apparatus in which shelled eggs may be packed and thereafter selectively extracted therefrom so as to eliminate the nuisance of messy egg shells.

It is still another object of the present invention to provide novel egg-packaging apparatus which is characterized by being substantially more compact and easily handled than conventional egg boxes or crates.

The packaging apparatus, which may be formed in any of several embodiments, includes a container structure which may be made of rigid or pliant material formed into a number of interconnecting compartments. Each interconnecting compartment is appropriately dimensioned for receiving the yolk and white portions of one egg of the commercial grade being packaged, and thus substitutes for the shell of the shelled eggs. Suitable restrictions are formed between the interconnecting compartments so as to restrict the tendency of the shelled eggs to mix during shipment and storage, and to permit the pouring or otherwise extracting one or more eggs at a time without emptying the entire container. In the several embodiments of the egg-packaging apparatus, the restrictions between the compartments may be formed as part of the container wall or installed as separate internal or external parts. Closure means are provided for tightly closing the container so that the shelled eggs may be conveniently refrigerated, transported and sold therein. The container wall further is preferably made of a transparent material so that egg distributors and consumers may visibly inspect the quality of the eggs.

A better understanding of the present invention may be had from the following detailed description when read in conjunction with the accompanying drawings, in which.

Figure 1:
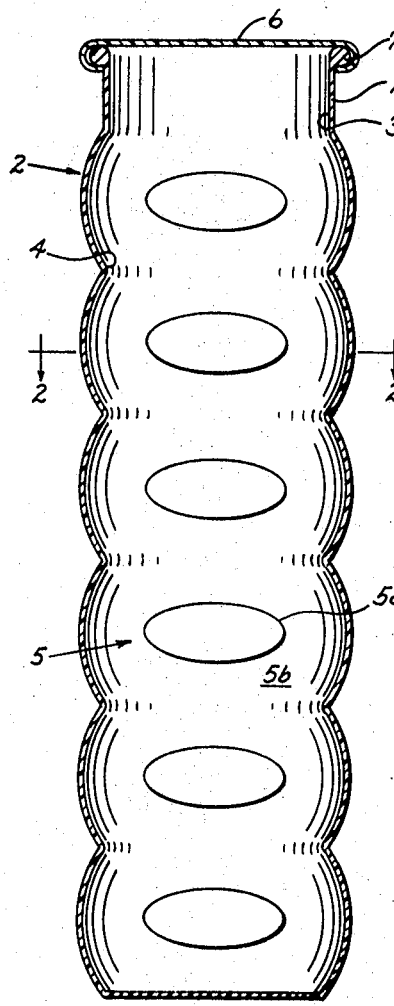
FIG. 1 is a cross-sectional elevation view of an embodiment of egg-packaging apparatus in accordance with the present invention.
Figure 2:
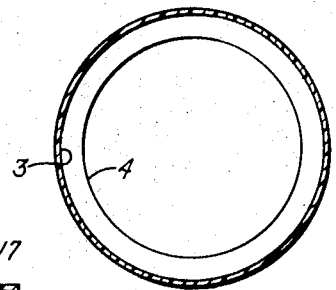
FIG. 2 is a cross-sectional view of the apparatus of FIG. 1 taken along the line 2—2 of FIG. 1.

Referring to the drawings in more detail, there is shown in FIGS. 1 and 2 one embodiment of egg-packaging apparatus comprising a rigid container structure 1 formed into a plurality of interconnecting circular compartments 2. Six compartments 2 are shown in FIG. 1, one of which is identified. The compartments 2 are located one above the other and each has a maximum circumference at its center 3. Each compartment 2 narrows from its center 3 to form restriction means or lips 4 at their upper and lower ends. The restriction means 4 have a circumference sufficiently large to permit the passage of a shelled egg therethrough, but are sufficiently smaller than the circumference of the compartment center 3 so as to restrict the flow of eggs loaded in the compartments 2, thereby to prevent shelled eggs loaded in the container 1 from intermixing.

Eggs 5, which have first been shelled by conventional means so as to leave the yolk 5a and white 5b portions intact, are shown in FIG. 1 loaded in their natural state in the container 1. The shelled eggs 5 may be loaded into the container 1, for example, by pouring and it has been found that the white portion 5b of an egg 5 naturally adheres to its associated yolk portion 5a. Each compartment 2 contains and supports one of these shelled eggs 5. Closure means in the form of a snap-on lid or cover 6 is also shown secured over a lip 7 formed around the mouth of the container 1.

The compartments 2 formed in the container 1 are appropriately dimensioned in each case to accommodate the size of the commercially graded eggs to be loaded therein. A container 1 having such compartments 2 may, for example, be made by appropriately molding glass or plastic. Preferably, the material used for forming the container 1 should be transparent and have a high thermal conductivity. Thereby, the quality of the eggs 5 loaded in the container 1 may be visually inspected and readily refrigerated.

With the eggs 5 loaded in the container 1, the shelled eggs 5 are appropriately packaged for refrigeration, transportation and sale to the consumer. The restriction means 4 between each of the compartments 2 in the container 1 functions during transport and storage to prevent the yolk and white portions of an egg 5 in one compartment from mixing with yolk and white portions of the eggs 5 in adjacent compartments. After the eggs 5 have been purchased, they may readily be extracted from the container 1 by removing the lid 6 and pouring the eggs 5 therefrom. The restriction means 4 at the instant of pouring functions to restrict the flow of eggs 5 from one compartment 2 to another so that one shelled egg 5 at a time may be conveniently poured from the container 1. Further, it is noted that for purposes of transporting a number of containers 1, the containers 1 could be fitted into flat frame structure so that they could then be packed in boxes or crates, one container adjacent another.

Figure 3:
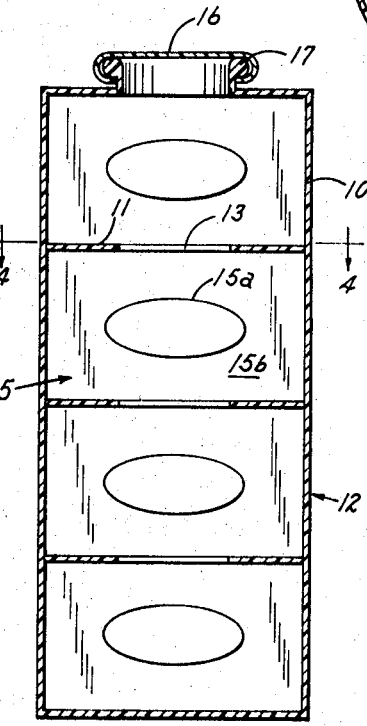
FIG. 3 is a cross-sectional elevation view of another embodiment of egg-packaging apparatus in accordance with the present invention.
Figure 4:
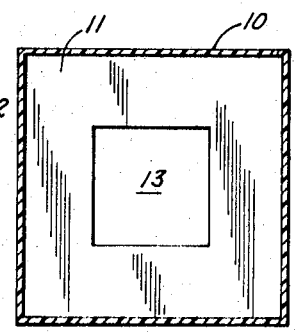
FIG. 4 is a cross-sectional view of the apparatus of FIG. 3 taken along the line 4—4 of FIG. 3.

There is shown in FIGS. 3 and 4 a second embodiment of egg-packaging apparatus comprising a rigid four-walled container structure 10. The opposite pair of walls of the container 10 are preferably parallel and preferably define a square cross-sectional area, as shown in FIG. 4. Restriction means in the form of flat dividers or partitions 11 are mounter perpendicular to each of the walls of the container 10 to divide the container 10 into a plurality of compartments 12. Four compartments 12 are defined in the container 10 shown in FIG. 3, one of which is identified by the numeral 12. The dividers 11, as shown in FIG. 4, define a square opening 13 between adjacent compartments 12 so that the compartments 12 are interconnecting. The square opening 13 defined is sufficiently large to allow the passage of a shelled egg therethrough yet sufficiently small to prevent the eggs loaded in the container 10 from intermixing.

Shelled eggs 15, having yolk portions 15a and white portions 15b, are shown in FIG. 3 loaded into the container 10. Each compartment 12 is dimensioned so as to hold and support only one of the eggs 15. The container 10 may be constructed by molding or forming a preferably clear glass or plastic structure. Again, it may be desirable that the material used for forming the container 10 have a high thermal conductivity for purposes of refrigeration. Closure means in the form of a snap-on lid 16 is shown secured over a lip 17 formed around the mouth of the container 10.

With the eggs 15 loaded in the container 11, the shelled eggs 15 are conveniently packaged for refrigeration, transportation and sale. With the lid 16 removed, eggs may be poured from the container 10 one egg at a time. It is noted that the restriction means provided by the dividers 11 function similarly to the restriction means 4 in the earlier described container structure 1. The restriction means 11 prevent the yolk and white portions of an egg 15 in one compartment from mixing with the shelled eggs 15 in adjacent compartments and restrict the flow of shelled eggs 15 from one compartment 12 to another so that one egg 15 at a time may be poured from the container 10.

Thus, two embodiments of egg-packaging apparatus comprising rigid walled containers defining a plurality of interconnecting egg-receiving compartments have been described. It is here noted that the cross-sectional areas of these compartments could conceivably take any convenient shape and that the containers could be made from any suitable material. Further, the restriction means between adjacent compartments may be formed as lips, dividers or otherwise and may be made as separate structure to be inserted in the container or as an integral part of the container wall.

Figure 5:
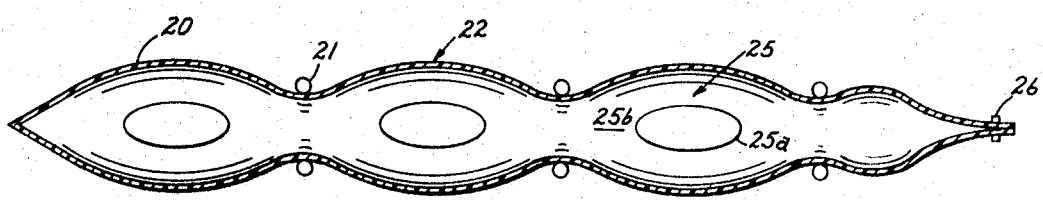
FIG. 5 is a cross-sectional side view of yet another embodiment of egg-packaging apparatus in accordance with the present invention.

There is shown in FIG. 5 an egg-packaging apparatus comprising a pliable container structure or tube 20. Restriction means in the form of movable rings 21 are fitted along the tube 20 so as to restrict the tube 20 and thereby form a plurality of compartments 22 in the tube 20. Three compartments 22, one of which is identified, have been formed in the tube 20.

In using the tube 20, the rings 21 are positioned so as to define compartments 22 of a predetermined dimension suitable for receiving the size of shelled eggs to be loaded therein. The yolk portion 25a and white portion 25b of shelled eggs 25 are then loaded one egg at a time into the tube 20. Each egg 25 fills one compartment 22, and the restricting rings 21, which permit the passage of a shelled egg, function to prevent the intermixing of the eggs 25 in adjacent compartments 22. Closure means in the form of a clamp 26 is then clamped on the mouth of the tube 20 to seal the tube 20. The eggs 25 are now in a convenient packaged form for refrigeration, transport and sale.

When desired, an egg 25 may be extracted from the tube 20 by removing the clamp 26 and gently squeezing the tube 20 or pouring the egg 25 therefrom. The restriction means or rings 21 function to restrict the flow of eggs 25 from one compartment to another, thereby to permit the extraction of one egg 25 at a time.

The tube 20 may be made from a flexible transparent plastic material or from other suitable material. It is noted that the material used in constructing all of the egg-packaging apparatus herein described should preferably be quite inexpensive so that the packaging apparatus may be disposable.

The practice of my invention contemplates the containers as being of different sizes so as to accommodate any desired number of eggs, such as 4, 6, 8 or 12 for example. The degree and shaping of the restriction between compartments may be varied particularly when the volume of a given compartment is closely related to the size of a shelled egg to be confined therein. Also, the containers shown and described herein may be used to package whites only or yolks only where there is a demand for such product provided the above-stated volume relationship is maintained.

I claim:

1. A egg package comprising:
a container structure having a mouth portion;
restriction means formed in said container structure for dividing said container structure into a plurality of egg-receiving compartments of predetermined volume, said restriction means defining a passage between adjacent ones of said compartments so that said compartments interconnect with each other and are in communication with said mouth portion whereby shelled eggs may be loaded into said compartments through said mouth portion, said restriction means being operable to restrict the flow of shelled eggs loaded in said compartments so as to prevent the intermixing of the shelled eggs loaded in said compartments and to permit the extraction of one shelled egg at a time from said container structure through said mouth portion, and shelled eggs in said compartments.

2. The invention as recited in claim 1, including means for closing the mouth of said container structure.

3. The invention recited in claim 2, wherein said container structure is substantially rigid.

4. The invention recited in claim 2, wherein said container structure is pliant.

5. The invention recited in claim 2, wherein said restriction means is formed as an integral part of said container structure.

6. The invention recited in claim 2, wherein said restriction means is formed by separate internal structure positioned in said container structure.

7. The invention recited in claim 2, wherein said container structure is pliant and said restriction means is formed by restricting rings externally positioned around said container structure.

8. The invention recited in claim 7, wherein said restricting rings are movable along said container structure whereby the volume of each of said compartments defined by said rings may be selectively predetermined.

9. The invention recited in claim 2, wherein said container structure is transparent whereby shelled eggs loaded therein may be visually inspected.

10. The invention recited in claim 2, wherein said container structure is made of a material having a high thermal conductivity whereby shelled eggs loaded therein may be refrigerated.

* * * * *